United States Patent
Li et al.

(10) Patent No.: US 11,886,262 B2
(45) Date of Patent: *Jan. 30, 2024

(54) POWER MANAGEMENT IN A MULTIPLE-PROCESSOR COMPUTING DEVICE

(71) Applicant: NVIDIA Corporation, Santa Clara, CA (US)

(72) Inventors: Sau Yan Keith Li, San Jose, CA (US); Thomas E. Dewey, Menlo Park, CA (US); Arthur Chen, Sunnyvale, CA (US); Simon Lai, Mountain View, CA (US); Amit Pabalkar, Fremont, CA (US); Santosh Nayak, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 17/306,654

(22) Filed: May 3, 2021

(65) Prior Publication Data

US 2021/0255680 A1  Aug. 19, 2021

Related U.S. Application Data

(63) Continuation of application No. 16/108,006, filed on Aug. 21, 2018, now Pat. No. 10,996,725.

(51) Int. Cl.
*G06F 1/00* (2006.01)
*G06F 1/26* (2006.01)
*G06F 9/4401* (2018.01)
*G06F 1/08* (2006.01)

(52) U.S. Cl.
CPC .............. *G06F 1/26* (2013.01); *G06F 1/08* (2013.01); *G06F 9/4411* (2013.01)

(58) Field of Classification Search
CPC ...... G06F 3/162; G06F 3/04847; G06F 3/165; G10K 11/18; H04M 1/72412; H04M 1/72442; H04R 1/00; H04R 3/00; H04R 2499/11; H04S 7/308; H04S 7/40
See application file for complete search history.

(56) References Cited

U.S. PATENT DOCUMENTS

| | | | |
|---|---|---|---|
| 2008/0104428 A1 | 5/2008 | Naffziger et al. | |
| 2009/0309570 A1 | 12/2009 | Lehmann et al. | |
| 2011/0022356 A1* | 1/2011 | Nussbaum | G06F 11/3433 702/182 |
| 2011/0238974 A1* | 9/2011 | Wells | G06F 1/3293 713/100 |
| 2018/0097245 A1 | 4/2018 | Matsusue et al. | |
| 2018/0129534 A1 | 5/2018 | Iyigun et al. | |
| 2019/0041951 A1* | 2/2019 | Shapira | G06F 1/3206 |
| 2019/0272021 A1* | 9/2019 | Olarig | G06F 3/0679 |

* cited by examiner

Primary Examiner — Xuxing Chen
(74) Attorney, Agent, or Firm — Artegis Law Group, LLP (57) ABSTRACT

A method for managing power in a multiple processor computing device includes detecting a first amount of power being used by a first processor of the computing device; determining an amount of extra power available based on the first amount of power and a power budget for the first processor; and transmits a value to a driver associated with a second processor of the computing device, wherein the value indicates the amount of extra power available, wherein the driver adjusts at least one operating parameter of the second processor based on the amount of extra power available.

22 Claims, 5 Drawing Sheets

POWER MANAGEMENT IN A MULTIPLE-PROCESSOR COMPUTING DEVICE

CROSS-REFERENCE TO RELATED APPLICATIONS

This application is a continuation of the co-pending U.S. patent application titled, "POWER MANAGEMENT IN A MULTIPLE-PROCESSOR COMPUTING DEVICE," filed on Aug. 21, 2018 and having Ser. No. 16/108,006. The subject matter of this related application is hereby incorporated herein by reference.

BACKGROUND OF THE INVENTION

Embodiments of the present invention relate generally to computer systems and, more specifically, to power management in a multiple-processor computing device.

DESCRIPTION OF THE RELATED ART

In laptop computers, effectively managing power consumption is essential for a satisfactory user experience. Effective power management is especially important in high-performance laptops, such as "gaming computers." High-performance computers typically include a central processing unit (CPU) and at least one graphics processing unit (GPU) that operate in parallel, with the GPU performing the more complex graphics-related operations. Because the CPU and the GPU are the components in high-performance laptops that use the most power, each of the CPU and the GPU typically has a separate power controller, and heat generated by the CPU and GPU is removed from the machine through one or more heat sinks.

In order to optimize battery use, laptop computers are normally designed with an overall power budget that allows the CPU to consume power at a CPU maximum power limit and the GPU to simultaneously consume power at a GPU maximum power limit. Thus, in a worst-case scenario, where both the CPU and the GPU are operating at their respective maximum power limits, the overall power budget is structured to provide both the CPU and the GPU with sufficient power. However, during many typical operating scenarios, such as when a video game is running on the high-performance laptop, the CPU rarely consumes power at the CPU maximum power limit. In such situations, there oftentimes is available power within the overall power budget because the GPU operates at or near the GPU maximum power limit, while the CPU operates below or substantially below the CPU maximum power limit. Such power usage inefficiencies can unnecessarily hinder the performance of high-performance laptops and reduce the overall quality of the user experience.

As the foregoing illustrates, what is needed in the art are more effective techniques for managing power consumption in multi-processor computing devices.

SUMMARY

One embodiment of the present invention sets forth a method for managing power in a multiple processor computing device. The method includes detecting a first amount of power being used by a first processor of the computing device; determining an amount of extra power available based on the first amount of power and a power budget for the first processor; and transmits a value to a driver associated with a second processor of the computing device, wherein the value indicates the amount of extra power available, wherein the driver adjusts at least one operating parameter of the second processor based on the amount of extra power available.

At least one technological advantage of the disclosed techniques relative to the prior art is that the power budget for a multiple-processor computing device can be efficiently employed to increase performance of the overall system. Thus, within a given power budget, better performance for a particular processor of the multiple-processor computing device and for the overall system is enabled relative to prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Description

Figure 1:
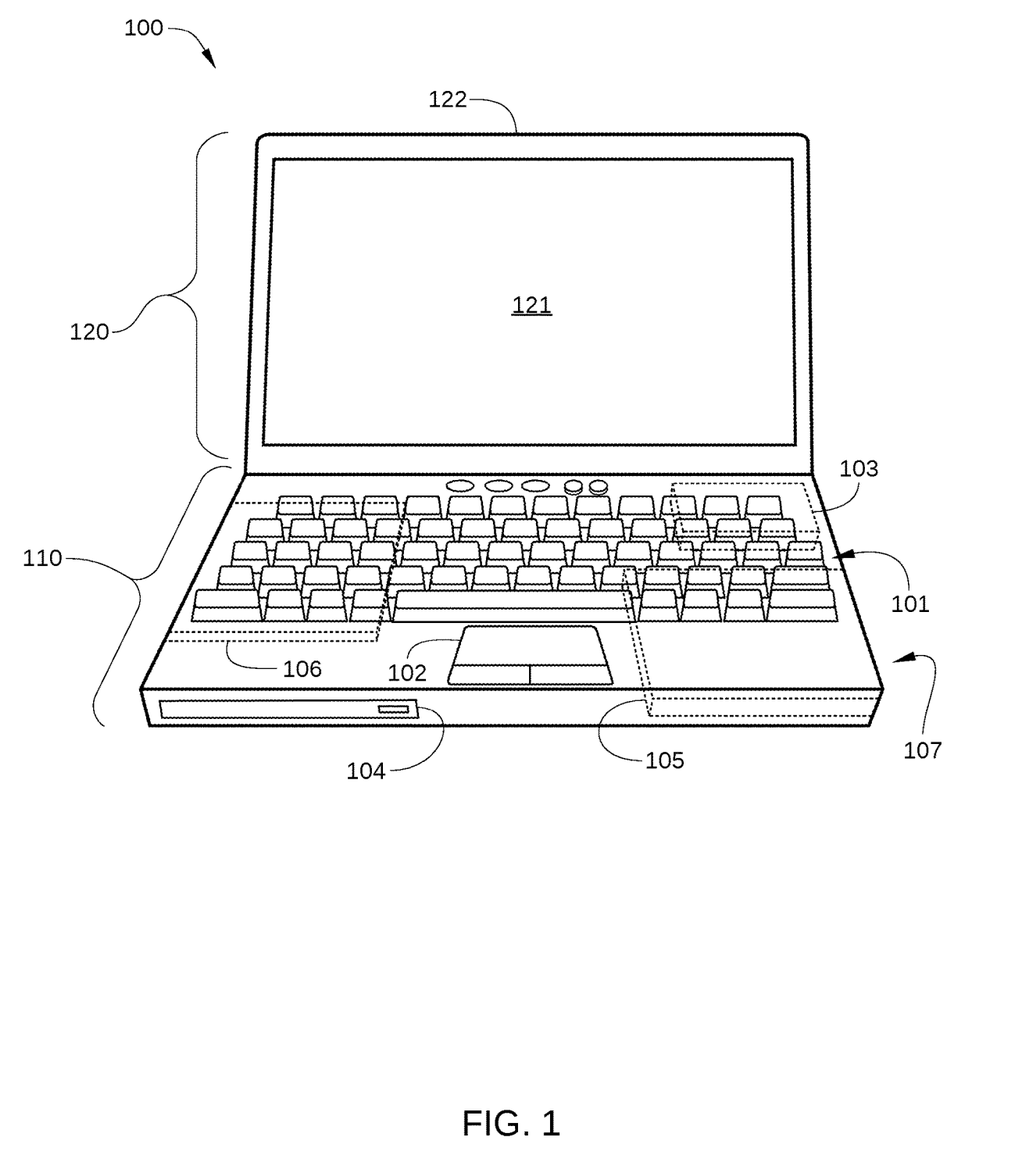
FIG. 1 illustrates a computing device configured to implement one or more aspects of the present invention.

FIG. 1 illustrates a computing device 100 configured according to implement one or more aspects of the present invention. Computing device 100 is a portable personal computer with a hinged, or "clamshell," configuration, and generally includes the capabilities of a desktop computer and associated external devices. For example, in some embodiments, computing device 100 includes an integrated keyboard 101, a touchpad (or trackpad) 102, and a display screen 121. By folding display screen 121 closed onto keyboard 101, computing device 100 can be readily stowed and carried. Therefore, computing device 100 can be easily transported and is suitable for mobile use. As shown, computing device 100 includes a base portion 110 and a display portion 120. Base portion 110 includes, among other things, keyboard 101, touchpad 102, an internal cooling fan 103, an optical drive 104, a hard disk drive and/or solid-state drive (HDD/SSD) 105, and a network interface 106.

Display portion 120 includes display screen 121, such as a liquid crystal display (LCD) or light-emitting diode (LED) based display screen. Computing device 100 can further include physical interfaces for various input and output devices along side portion 107 of base portion 110, such as one or more universal serial bus (USB) ports, external display ports, Ethernet ports, and the like. Computing device 100 may further include one or more integrated webcams and/or built-in microphones (not shown).

While the embodiment of computing device 100 illustrated in FIG. 1 is a laptop computer, embodiments described herein can be implemented in any suitable computing device, including a desktop computer, a laptop computer, a smart phone, a personal digital assistant (PDA), video game console, set top console, tablet computer, or any other type of computing device suitable for practicing one or more embodiments of the present invention.

According to various embodiments, computing device 100 includes multiple processors for greater computational performance. For example, in some embodiments, computing device 100 is a high-performance computer that includes a central processing unit (CPU) and graphics processing unit (GPU). One such embodiment is illustrated in FIG. 2.

Figure 2:
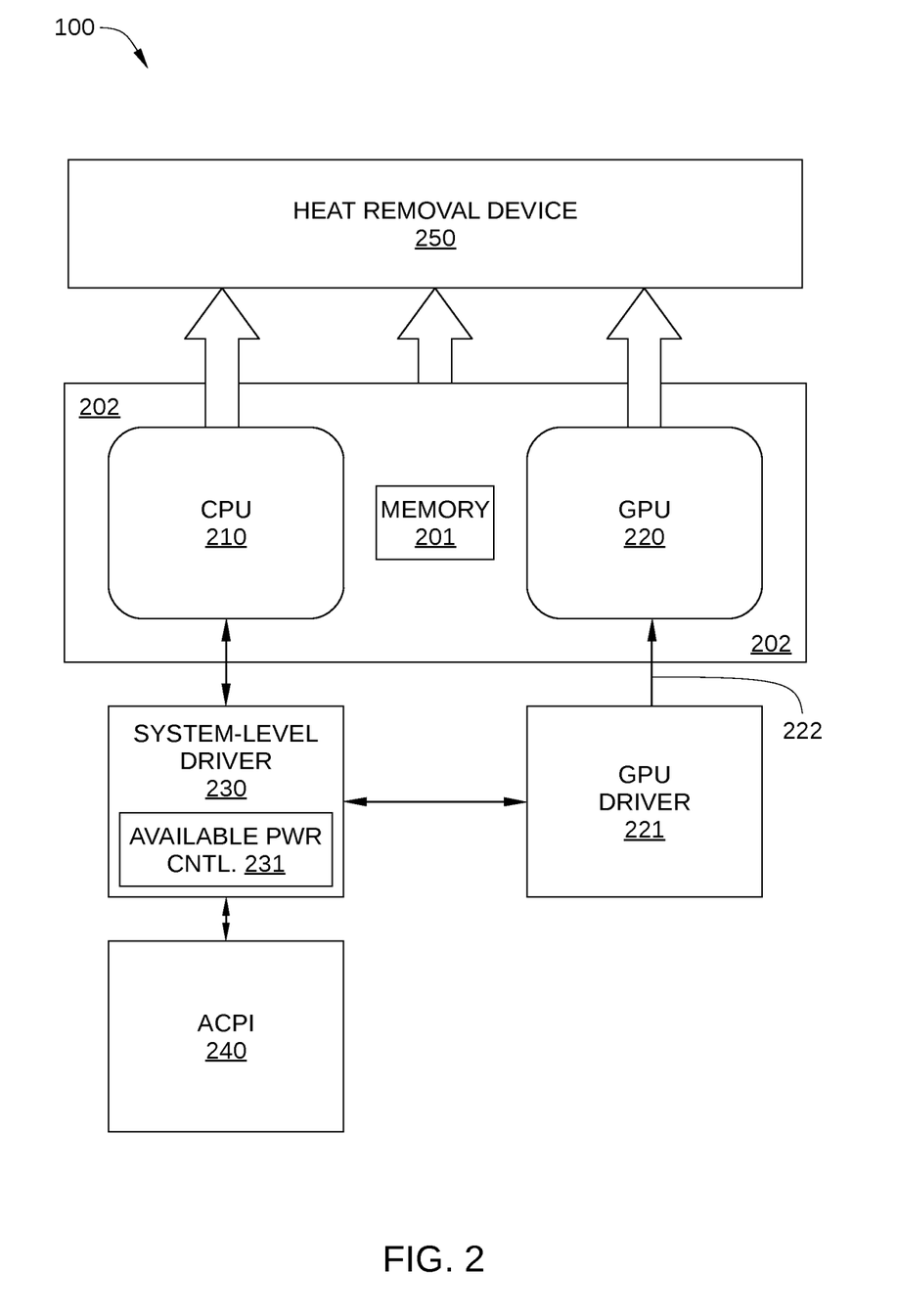
FIG. 2 is a more detailed illustration of the computing device of FIG. 1, according to various embodiments of the present invention.

FIG. 2 is a more detailed illustration of computing device 100, according to various embodiments of the present invention. As shown, computing device 100 includes a CPU 210, a GPU 220, and a memory chip 201 mounted on a printed circuit board (PCB) 202 or other mounting substrate, a system-level driver 230, a GPU driver 221, and an advanced configuration and power interface (ACPI) 240. Computing device 100 further includes a heat removal system 250 that is thermally coupled to CPU 210 and GPU 220 and, in some embodiments, to PCB 202.

CPU 210 is a processor chip that performs the general operations of computing device 100, such as input/output (I/O) operations and running an operating system (OS) and applications that are not graphics-intensive. By contrast, GPU 220 is a processor chip that performs graphics-related operations and other highly parallelized computing workloads, such as generating video frames, rendering display images to display screen 121 (e.g., 2D and 3D game rendering), and the like. In the embodiment illustrated in FIG. 2, computing device 100 includes two processing units, i.e., CPU 210 and GPU 220. In other embodiments, computing device 100 includes more than two processing units.

System-level driver 230 is a framework for performing system-level power and performance operations. For example, system-level driver 230 is configured to communicate with ACPI 240 subsystem to receive a budgeted power consumption limit for CPU 210 (a "budgeted CPU power limit") and a budgeted power consumption limit for GPU 220 (a "budgeted GPU power limit"). System-level driver 230 is further configured to communicate with GPU driver 221 to receive current operating parameters of GPU 220. In addition, system-level driver 230 includes an available power controller 231, which is a control loop that performs various embodiments of the invention. Available power controller 231 can be implemented via software, firmware, or logic circuits. The functionality of available power controller is described in greater detail below in conjunction with FIG. 4.

GPU driver 221 manages the GPU clock (or clocks) based on the GPU power limit and on the available power of computing device 100, as determined by available power controller 231. For example, GPU driver 221 can provide a temporarily increased GPU power limit to GPU 220 via a control signal 222. As processing is requested of GPU 220, such as by an OS running on CPU 210, GPU driver 221 manages power provided to GPU 220 accordingly. In addition, in some situations, when greater computational speed of GPU 220 can be beneficial to the performance of laptop 100, GPU driver 221 increases clock speeds for GPU 220. In some embodiments, when more available power is determined by available power controller 231, GPU driver 221 overclocks GPU 220.

ACPI 240 is a software interface that enables an OS running on computing device 100 to detect and configure hardware components of computing device 100. As such, ACPI performs status monitoring and enables the OS to perform power management by putting unused components of computing device 100 to sleep.

Heat removal system 250 includes one or more heat removal devices for dissipating heat generated by CPU 210, GPU 220, memory chip 201, and other heat-generating components coupled to PCB 202. For example, in some embodiments, heat removal system 250 includes a heat sink that is coupled to PCB 202. The heat sink can include one or more heat pipes and/or a heat-conducting plate (such as a copper or aluminum plate), which can have heat exchanger fins formed thereon. In some embodiments, the heat sink includes a vapor chamber with a vapor region and a condensate collection region. In such embodiments, heat is transferred away from PCB 202 by evaporative cooling when a condensed liquid in the condensate collection region is heated and evaporates into a vapor and the vapor flows into the vapor region of the vapor chamber. In some embodiments, heat removal system 250 further includes one or more internal cooling fans 103 (shown in FIG. 1) configured to direct air across one or more surfaces of the heat sink and/or PBC 202.

When computing device 100 runs a graphics-intensive video game or performs some other other highly parallelized computing workload, GPU 220 typically consumes power at or near the budgeted GPU power limit. By contrast, CPU 210 is more likely to consume power at or near the budgeted CPU power limit when a large number of different applications are being executed simultaneously by computing device 100 on CPU 210. In general, such a scenario rarely occurs while the user is also running a graphics-intensive program, such as a video game. Consequently, when GPU 220 is consuming power at the budgeted GPU power limit, and is normally prevented from consuming more power, CPU 210 is typically consuming power well below the budgeted CPU power limit. As a result, the GPU 220 is consuming power at a level limited by the budgeted GPU power limit even though there is unused power available in the total power budget of computing device 100. According to various embodiments, such unused power is directed to GPU 220, for example to enable overclocking of GPU 220 for improved computational performance. One such embodiment is illustrated in FIGS. 3A-3C.

Figure 3A:
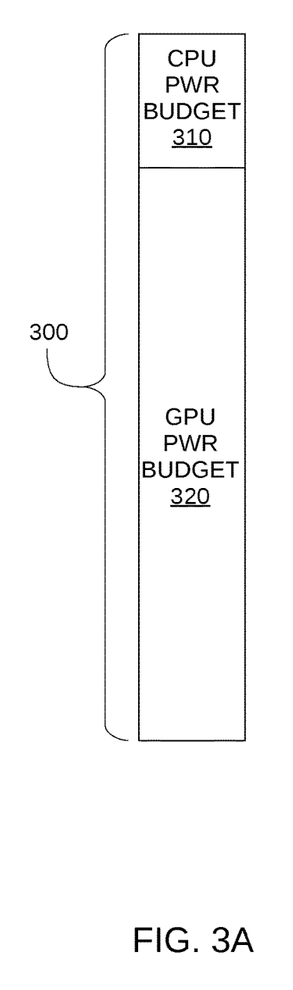
FIG. 3A is a conceptual illustration of the power budget for the computing device of FIG. 1, according to various embodiments of the present invention.

FIG. 3A is a conceptual illustration of total power budget 300 for computing device 100, according to various embodiments of the present invention. Total power budget 300 represents the total power available at a particular time for the operation of computing device 100. In addition, total power budget 300 corresponds to the total of a CPU power budget 310 and a GPU power budget 320. For example, in an embodiment in which CPU 210 is expected to consume from about 5 W of power when idle up to about 50 W of power during peak operation, CPU power budget 310 is set at 50 W. Similarly, in an embodiment in which GPU 220 is expected to consume from about 10 W of power when idle up to about 100 W of power during peak operation, GPU power budget 320 is set at 100 W. Thus, in such an embodiment, the total power budget 300 for computing device 100 is 150 W (50 W+100 W). In some embodiments, CPU power budget 310 is equal to a rated power consumption (e.g., a typical maximum power consumption) of CPU 210 and a GPU power budget 320 is equal to a rated power consumption (e.g., a typical maximum power consumption) of GPU 220.

Figure 3B:
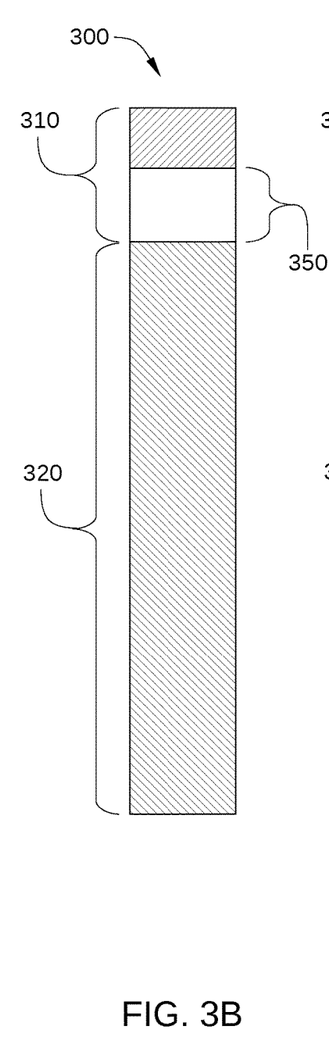
FIG. 3B conceptually illustrates how the power budget for the computing device of FIG. 1 is allocated, according to the prior art.

FIG. 3B conceptually illustrates how total power budget 300 for computing device 100 is allocated, according to the prior art. In FIG. 3B, the current power used by CPU 210 is depicted by a hash-marked region within CPU power budget 310, and the current power used by GPU 220 is depicted by a hash-marked region within GPU power budget 320. In the embodiment illustrated in FIG. 3B, computing device 100 is assumed to be running a graphics-intensive application or executing some other highly parallelized computing workload, such as a 3D video game. Consequently, the power use of GPU 220 is equal to and limited by GPU power budget 320 (e.g., 100 W). By contrast, the current power used by CPU 210 is significantly less than CPU power budget 310 (e.g., 35 W). As a result, available power 350, which corresponds to the unused portion of CPU power budget 310 (e.g., 15 W), is not utilized by computing device 100. According to various embodiments, available power 350 can be determined by available power controller 231 and provided to GPU 320 by GPU driver 221, as shown in FIG. 3C.

Figure 3C:
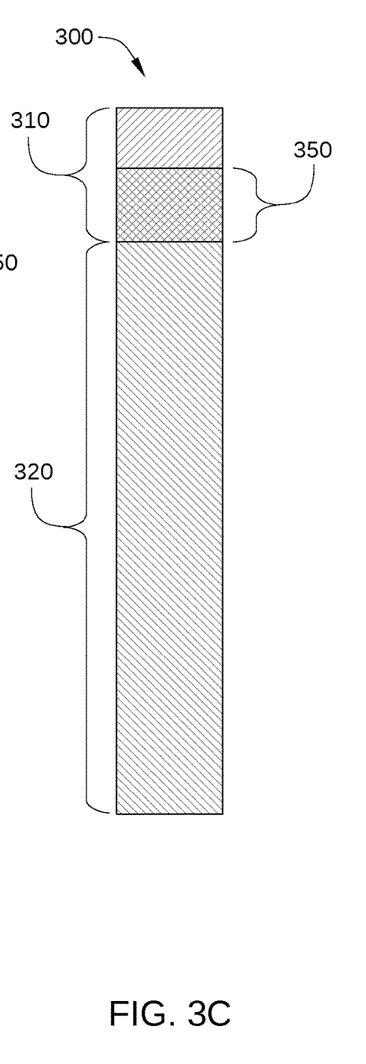
FIG. 3C conceptually illustrates how the power budget for the computing device of FIG. 1 is allocated, according to various embodiments of the present invention.

FIG. 3C conceptually illustrates how total power budget 300 for computing device 100 is allocated, according to various embodiments of the present invention. In FIG. 3C, current power used by CPU 210 is depicted by a hash-marked region within CPU power budget 310, and current power used by GPU 220 is depicted by a hash-marked region within GPU power budget 320 and a double hash-marked region within CPU power budget 310. As shown, in addition to GPU power budget 320 (e.g., 100 W), GPU 220 consumes available power 350 (e.g., 15 W). Thus, all of total power budget 300 for computing device 100 is utilized, even though CPU 210 is consuming less power than CPU power budget 310. In some embodiments, to consume more than 100% of GPU power budget 320, GPU 220 is overclocked by GPU driver 221.

In some embodiments, available system power is provided to GPU 220 when a power budget for system components of computing device 100 is not fully utilized by such components. Examples of system components of computing device 100 include some or all of keyboard 101, touchpad 102, display screen 121, internal cooling fan(s) 103, optical drive 104, HDD/SSD 105, and network interface 106. One such embodiment is illustrated in FIGS. 4A-4C.

Figure 4A:
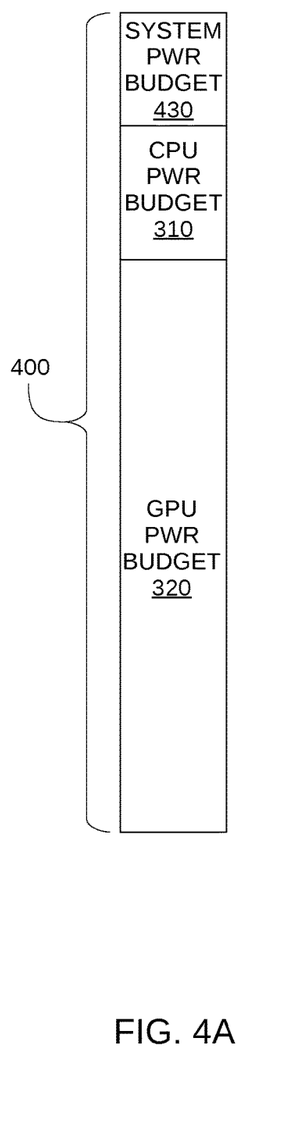
FIG. 4A conceptually illustrates a power budget for the laptop computer of FIG. 1, according to various other embodiments of the present invention.

FIG. 4A conceptually illustrates a total power budget 400 for computing device 100, according to various other embodiments of the present invention. Total power budget 400 represents the total power available at a particular time for the operation of computing device 100, and corresponds to the total of CPU power budget 310, GPU power budget 320, and system power budget 430. For example, in an embodiment in which CPU power budget 310 is set at 50 W and GPU power budget 320 is set at 100 W, system power budget 430 may be on the order of 20 W. Thus, in such an embodiment, the total power budget 400 for computing device 100 is 170 W (50 W+100 W+20 W).

Figure 4B:
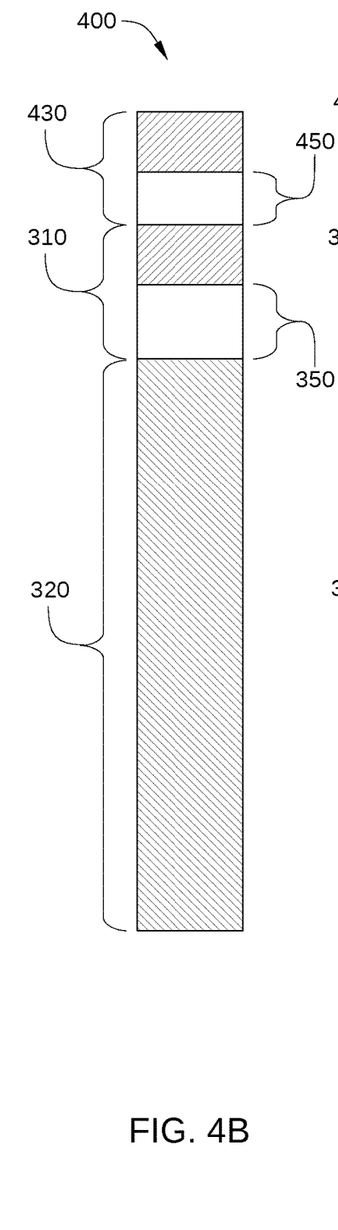
FIG. 4B conceptually illustrates how the total power budget for a laptop computer.

FIG. 4B schematically illustrates how total power budget 400 for computing device 100 is allocated, according to the prior art. In FIG. 4B, current power used by CPU 210 is depicted by a hash-marked region within CPU power budget 310, current power used by GPU 220 is depicted by a hash-marked region within GPU power budget 320, and current power used by system components of laptop 100 is depicted by a hash-marked region within system power budget 430. As shown, the current power used by CPU 210 is significantly less than CPU power budget 310, and as a result, available power 350 is not utilized by computing device 100. In addition, the current power used by system components of computing device 100 is significantly less than system power budget 430. As a result, available power 450, which corresponds to the unused portion of system power budget 430, is also not utilized by computing device 100. According to various embodiments, available power 450 can be determined by available power controller 231 and provided to GPU 320 by GPU driver 421, as shown in FIG. 4C.

Figure 4C:
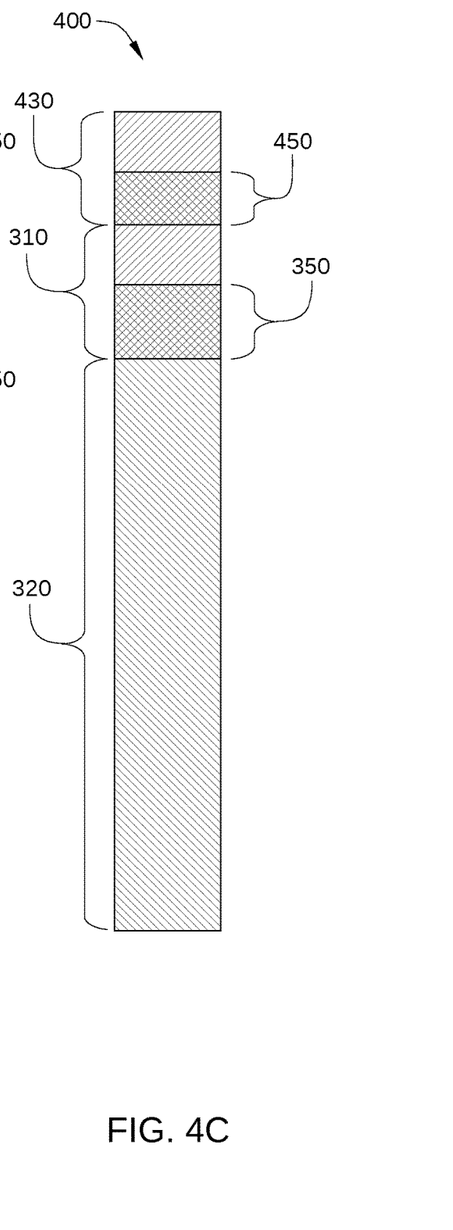
FIG. 4C schematically illustrates a utilization of total power budget for the laptop computer of FIG. 1, according to other various embodiments of the present invention.

FIG. 4C conceptually illustrates how total power budget 400 for computing device 100 is allocated, according to various other embodiments of the present invention. In FIG. 4C, current power used by CPU 210 is depicted by a hash-marked region within CPU power budget 310 and current power used by system components is depicted by a hash-marked region within system power budget 430. Further, current power used by GPU 220 is depicted by a hash-marked region within GPU power budget 320, a double hash-marked region within CPU power budget 310, and a double hash-marked region within system power budget 430. Thus, GPU 220 consumes available power 350 from CPU power budget 310 and available power 450 from system power budget 430. Consequently, all of total power budget 400 for computing device 100 is utilized, even though CPU 210 is consuming less power than CPU power budget 310 and system components of computing device 100 are consuming less power than system power budget 430.

Power Management in Multiple Processor Computing Device

Figure 5:
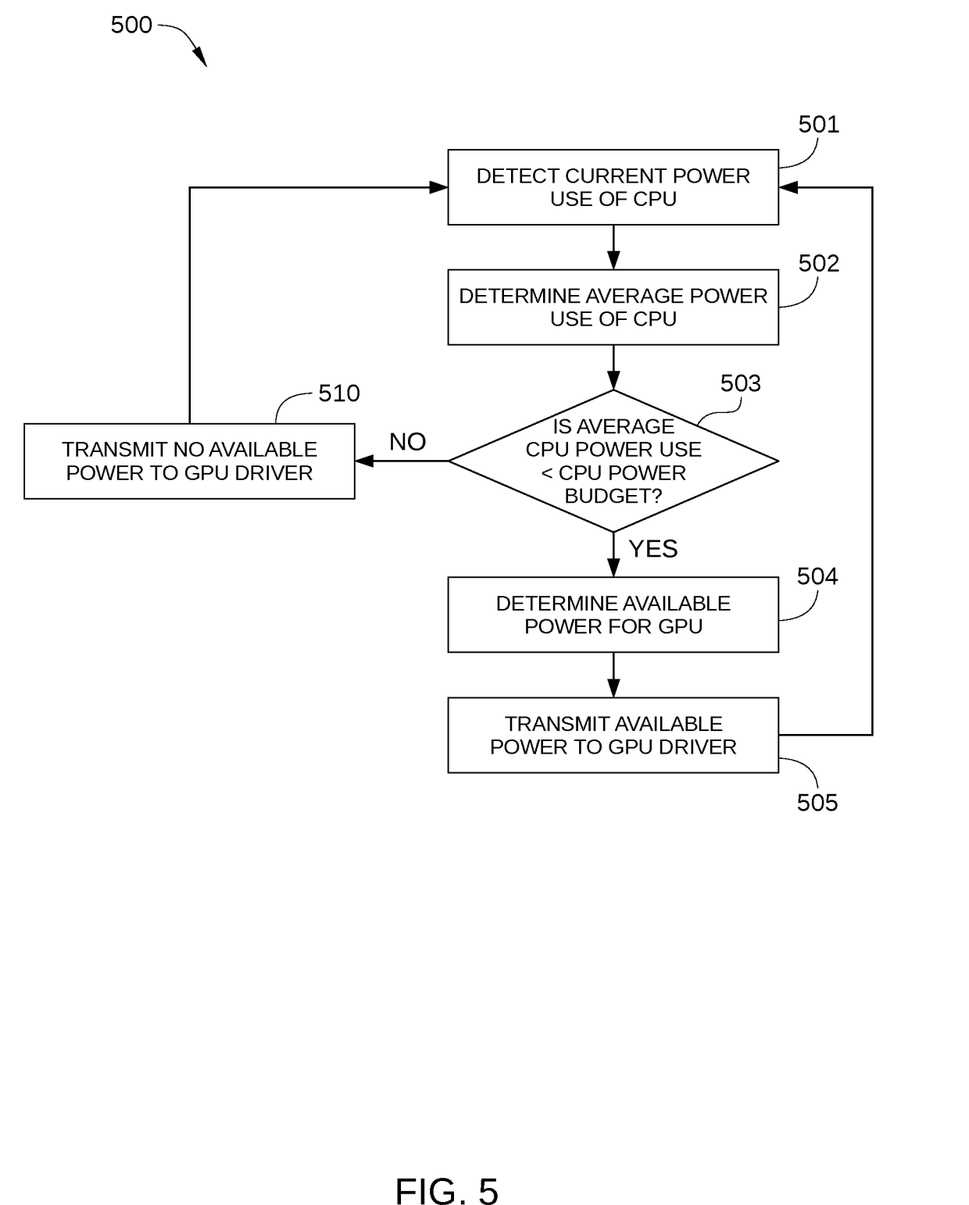
FIG. 5 is a flowchart of method steps for managing power consumption in a multiple-processor computing device, according to various embodiments of the present invention.

FIG. 5 is a flowchart of method steps for managing power consumption in a multiple processor computing device, according to various embodiments of the present invention. Although the method steps are described in conjunction with the systems of FIGS. 1-4C, persons skilled in the art will understand that any system configured to perform the method steps, in any order, is within the scope of the present invention.

As shown, a method 500 begins at step 501, where available power controller 231 detects a current power use of CPU 210. In some embodiments, available power controller 231 detects the current power use of CPU 210 by polling a register of CPU 210. In such embodiments, available power controller 231 performs step 501 periodically, for example every 100 ms.

In step 502, available power controller 231 determines an average power use for CPU 210. Any technically feasible approach may be employed in step 502 to determine the average power use. For example, in some embodiments, available power controller 231 determines the average power use for CPU 210 based on a simple average of power use values measured or detected over a recent time interval, such as over the last 1 to 5 seconds. In some embodiments, available power controller 231 determines the average power use for CPU 210 based on an exponential moving average of CPU power use values. Furthermore, any other suitable algorithm for determining an average power use for CPU 210 can be employed by available power controller 231 in step 502.

In step 503, available power controller 231 determines whether the average power use for CPU 210 is less than CPU power budget 310. If yes, method 500 proceeds to step 504; if no, method 500 proceeds to step 510.

In step 504, available power controller 231 determines available power from CPU power budget 310 for use by GPU 220. In one embodiment, available power controller 231 determines the available power for use by GPU 220 based on the difference between the average power use for CPU 210 and CPU power budget 310. In some embodiments, available power controller 231 further determines available power for use by GPU 220 based on a maximum allowable GPU power consumption. Specifically, available power controller 231 determines whether the addition of the available power from CPU power budget 310 to the current GPU power consumption exceeds the maximum allowable GPU power consumption. In such embodiments, available power controller 231 can modify the available power from CPU power budget 310 that is determined based on the difference between the average power use for CPU 210 and CPU power budget 310. That is, available power controller 231 reduces the available power so determined to prevent GPU 220 from being damaged by operating at a higher power consumption than the maximum allowable GPU power consumption. Alternatively, in some embodiments GPU driver 221 is configured to prevent the addition of available power from CPU power budget 310 from exceeding the maximum allowable GPU power consumption of GPU 220.

In step 505, available power controller 231 transmits the available power from CPU power budget 310 to GPU driver 221. GPU driver 221 then manages the power use of GPU 220 based on the additional available power. In some embodiments, GPU driver 221 overclocks GPU 220 when using the additional available power. Method 500 then returns to step 501 as shown.

In step 510, available power controller 231 transmits information indicating that there is no available power from CPU power budget 310 that can be employed by GPU driver 221. GPU driver 221 then manages the power use of GPU 220 based on there being no additional available power. Method 500 then returns to step 501.

In the embodiment of method 500 described above, available power from CPU power budget 310 is directed to GPU 220 when appropriate. Alternatively or additionally, in other embodiments of method 500, available power from system power budget 430 is directed to GPU 220 when appropriate. In such embodiments, in steps 501-505, available power from system power budget 430 is determined and transmitted to GPU driver 221.

In sum, embodiments of the present invention provide a multiple-processor computing device with improved power management. A controller determines available power in the computing device by detecting a current power use of a first processor and determining whether the current power use of the first processor is less than a power budget for the first processor. When the current power use of the first processor is less than the power budget for the first processor, the unused portion of the power budget is provided to the second processor. Thus, power that is unused by the first processor is directed to the second processor to enhance the performance of the second processor.

At least one advantage of the disclosed embodiments is that the power budget for a multiple-processor laptop computer can be efficiently employed to increase performance of the multiple processors. Thus, within a given power budget, better performance for a particular processor of the multiple-processor computing device and for the overall system is enabled relative to prior art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

1. In some embodiments, a method for managing power in a multiple processor computing device comprises: detecting a first amount of power being used by a first processor of the computing device; determining an amount of extra power available based on the first amount of power and a power budget for the first processor; and transmits a value to a driver associated with a second processor of the computing device, wherein the value indicates the amount of extra power available, wherein the driver adjusts at least one operating parameter of the second processor based on the amount of extra power available.

2. The method of clause 1, wherein detecting the first amount of power being used by the first processor comprises polling a register of the first processing unit.

3. The method of clauses 1 or 2, wherein determining the amount of extra power available is further based on a second amount of power being used by at least one other component of the computing device and a power budget for the at least one other component.

4. The method of any of clauses 1-3, wherein the driver associated with the second processor is configured to cause the second processor to overclock when a current power use of at least one other component of the computing device is less than a power budget for the at least one other component.

5. The method of any of clauses 1-4, wherein the driver causes the second processor to overclock when the amount of extra power available is greater than zero.

6. The method of any of clauses 1-5, wherein the at least one operating parameter of the second processor comprises a clock speed of the second processor.

7. In some embodiments, a non-transitory computer-readable storage medium includes instructions that, when executed by one or more processors, configure the one or more processors to perform the steps of: detecting a first amount of power being used by a first processor of the computing device; determining an amount of extra power available based on the first amount of power and a power budget for the first processor; and transmits a value to a driver associated with a second processor of the computing device, wherein the value indicates the amount of extra power available, wherein the driver adjusts at least one operating parameter of the second processor based on the amount of extra power available.

8. The non-transitory computer-readable storage medium of clause 7, wherein detecting the first amount of power being used by the first processor comprises polling a register of the first processing unit.

9. The non-transitory computer-readable storage medium of clauses 7 or 8, wherein determining the amount of extra power available is further based on a second amount of power being used by at least one other component of the computing device and a power budget for the at least one other component.

10. The non-transitory computer-readable storage medium of any of clauses 7-9, wherein the driver causes the second processor to overclock when the amount of extra power available is greater than zero.

11. The non-transitory computer-readable storage medium of any of clauses 7-10, wherein the instructions are included in a system-level driver of a computing device.

12. The non-transitory computer-readable storage medium of any of clauses 7-11, wherein the system-level driver of the computing device is coupled to an advanced configuration and power interface of the computing device.

13. The non-transitory computer-readable storage medium of any of clauses 7-12, wherein the at least one operating parameter of the second processor comprises a clock speed of the second processor.

14. The non-transitory computer-readable storage medium of any of clauses 7-13, wherein the driver associated with the second processor is configured to cause the second processor to overclock when a current power use of at least one other component of the computing device is less than a power budget for the at least one other component.

15. In some embodiments, a computing device comprises: a first processor coupled to a printed circuit board; a second processor coupled to the printed circuit board; and a controller that: detects a first amount of power being used by the first processor; determines an amount of extra power available based on the first amount of power and a power budget for the first processor; and transmits a value to a driver associated with the second processor, wherein the value indicates the amount of extra power available, wherein the driver adjusts at least one operating parameter of the second processor based on the amount of extra power available.

16. The computing device of clause 15, wherein determining the amount of extra power available is further based on a second amount of power being used by at least one other component of the computing device and a power budget for the at least one other component.

17. The computing device of clauses 15 or 16, wherein the driver associated with the second processor is configured to cause the second processor to overclock when a current power use of at least one other component of the computing device is less than a power budget for the at least one other component.

18. The computing device of any of clauses 15-17, wherein the at least one other component of the computing device comprises at least one of a display device, a keyboard, a touchpad, a networking interface, a hard disk drive, a solid-state drive, a cooling fan, and a memory chip.

19. The computing device of any of clauses 15-18, wherein the controller is included in a system-level driver of the computing device.

20. The computing device of any of clauses 15-19, further comprising an advanced configuration and power interface that is coupled to the system-level driver of the computing device.

Any and all combinations of any of the claim elements recited in any of the claims and/or any elements described in this application, in any fashion, fall within the contemplated scope of the present invention and protection.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing power in a multiple processor computing device, the method comprising:
   detecting a first amount of power used by one or more non-processor system components of the computing device;
   causing one or more other components of the computing device to be put to sleep;
   determining a first amount of extra power available based on a difference between the first amount of power and a system power budget associated with the one or more non-processor system components and the one or more other components; and
   transmitting, to a driver associated with a first processor included in the computing device, a first value indicating the first amount of extra power available, wherein the driver adjusts at least one operating parameter of the first processor based on the first amount of extra power available.

2. The computer-implemented method of claim 1, further comprising determining a second amount of extra power available that indicates a difference between a second amount of power used by a second processor included in the computing device and a processor power budget associated with the second processor.

3. The computer-implemented method of claim 2, further comprising transmitting, to the driver, a second value indicating the second amount of extra power available, wherein the driver adjusts the at least one operating parameter of the first processor based on the second amount of extra power available.

4. The computer-implemented method of claim 2, wherein the first processor comprises a graphics processing unit, and the second processor comprises a central processing unit.

5. The computer-implemented method of claim 2, wherein the computing device also comprises a third processor.

6. The computer-implemented method of claim 2, wherein the first processor comprises a graphics processing unit or a data processing unit, and the second processor comprises a central processing unit.

7. The computer-implemented method of claim 1, wherein detecting the first amount of power used by the one or more non-processor system components comprises determining an average amount of power used by the one or more non-processor system components over a time interval.

8. The computer-implemented method of claim 1, wherein determining the first amount of extra power available comprises limiting the first amount of extra power available based on a maximum allowable power consumption associated with the first processor.

9. The computer-implemented method of claim 1, wherein the one or more non-processor system components comprise at least one of a keyboard, a touchpad, a display, a cooling fan, an optical drive, a hard disk drive, a solid-state drive, or a network interface.

10. The computer-implemented method of claim 1, wherein the first processor comprises a graphics processing unit or a data processing unit.

11. A computer-implemented method for managing power in a multiple processor computing device, the method comprising:
    detecting a first amount of power being used by a first processor of the computing device;
    causing one or more other components of the computing device to be put to sleep;
    determining a first amount of extra power available based on a difference between the first amount of power and a power budget for the first processor and the one or more other components; and
    transmitting a value to a driver associated with a second processor of the computing device, wherein the value indicates the first amount of extra power available, and wherein the driver adjusts one or more operating parameters of the second processor based on the first amount of extra power available.

12. The computer-implemented method of claim 11, wherein the first processor comprises at least one of a central processing unit, a data processing unit, or a parallel processing unit, and the second processor comprises at least one of a central processing unit, a data processing unit, or a parallel processing unit.

13. The computer-implemented method of claim 11, further comprising determining a second amount of extra power available that indicates a difference between a second amount of power being used by a third processor of the computing device and a power budget for the third processor, and transmitting another value to the driver associated with the second processor that indicates the second amount of extra power available, wherein the driver adjusts the one or more operating parameters of the second processor based on the second amount of extra power available.

14. The computer-implemented method of claim 13, wherein the driver associated with the second processor is configured to cause the second processor to overclock when either the first amount of extra power available or the second amount of extra power available is greater than zero.

15. The computer-implemented method of claim 13, wherein the first processor comprises a central processing unit, the second processor comprises at least one of a data processing unit or a parallel processing unit, and the third processor comprises at least one of a data processing unit or a parallel processing unit.

16. The computer-implemented method of claim 11, wherein detecting the first amount of power being used by the first processor comprises polling a register of the first processor.

17. The computer-implemented method of claim 11, wherein the driver associated with the second processor is configured to cause the second processor to overclock when the first amount of extra power available is greater than zero.

18. The computer-implemented method of claim 11, wherein the one or more operating parameters of the second processor comprise a clock speed of the second processor.

19. The computer-implemented method of claim 11, wherein the first processor comprises a central processing unit, and the second processor comprises a graphics processing unit or a data processing unit.

20. A system, comprising:
   a first processor coupled to a printed circuit board;
   a second processor coupled to the printed circuit board; and
   a controller that distributes extra available power from the first processor to the second processor when the system is in operation by:
      detecting a first amount of power being used by the first processor;
      causing one or more other components of the computing device to be put to sleep;
      determining a first amount of extra power available based on a difference between the first amount of power and a power budget associated with the first processor and the one or more other components; and
      transmitting, to a driver associated with the second processor, a first value indicating the first amount of extra power available, wherein the driver adjusts at least one operating parameter of the second processor based on the first amount of extra power available.

21. The system of claim 20, wherein the first processor comprises a central processing unit, and the second processor comprises either a parallel processing unit or a data processing unit.

22. The system of claim 20, further comprising a driver associated with the second processor that adjusts one or more operating parameters of the second third processor in order to consume the extra available power.

* * * * *

UNITED STATES PATENT AND TRADEMARK OFFICE
CERTIFICATE OF CORRECTION

PATENT NO. : 11,886,262 B2
APPLICATION NO. : 17/306654
DATED : January 30, 2024
INVENTOR(S) : Sau Yan Keith Li et al.

It is certified that error appears in the above-identified patent and that said Letters Patent is hereby corrected as shown below:

In the Claims

Column 14, Claim 22, Line 19, please delete "third".

Signed and Sealed this
Nineteenth Day of March, 2024

Katherine Kelly Vidal
*Director of the United States Patent and Trademark Office*